United States Patent [19]

Li et al.

[11] Patent Number: 5,768,090
[45] Date of Patent: Jun. 16, 1998

[54] BIPOLAR ELECTROCHEMICAL CHARGE STORAGE DEVICES AND A METHOD OF FABRICATING THE SAME

[75] Inventors: Changming Li, Vernon Hills; Richard H. Jung, Park Ridge; John Nerz, Hawthorn Woods, all of Ill.

[73] Assignee: Motorola, Inc., Schaumburg, Ill.

[21] Appl. No.: 755,876

[22] Filed: Dec. 2, 1996

[51] Int. Cl.$^6$ ...................................................... H01G 9/00
[52] U.S. Cl. ........................ 361/523; 361/528; 361/532; 361/525; 29/25.03
[58] Field of Search ............................. 361/500, 503, 361/504, 509, 508, 512, 516, 522, 523, 525, 524, 528, 530, 534, 541; 29/25.03

[56] References Cited

U.S. PATENT DOCUMENTS

| | | | |
|---|---|---|---|
| 5,136,474 | 8/1992 | Sarangapani et al. | 361/502 |
| 5,450,279 | 9/1995 | Yoshida et al. | 361/502 |
| 5,541,019 | 7/1996 | Anani et al. | 429/59 |
| 5,555,155 | 9/1996 | Patel et al. | 361/503 |
| 5,587,872 | 12/1996 | Lian et al. | 361/525 |
| 5,646,815 | 7/1997 | Owens et al. | 361/502 |

*Primary Examiner*—Kristine L. Kincaid
*Assistant Examiner*—Anthony Dinkins
*Attorney, Agent, or Firm*—Kelly A. Gardner; Felipe J. Farley

[57] ABSTRACT

An electrochemical capacitor cell (140) is provided with first and second electrodes (146) (148), and a solid polymer electrolyte (154) is disposed therebetween. The electrodes may either be of the same or different materials and may be fabricated from ruthenium, iridium, cobalt, tungsten, vanadium, iron, molybdenum, hafnium, nickel, silver, zinc, and combinations thereof. The solid polymer electrolyte is in intimate contact with both electrodes, and is made from a polymeric support structure having dispersed therein an electrolyte active species. Also a method of fabricating a biopolar electrochemical charge storage device by assembling at least the first and second bipolar subassemblies together with the second layer of electrode active material for the first bipolar subassembly in direct contact with the first layer of electrode active material for the second bipolar subassembly without a current collector disposed therebetween.

22 Claims, 4 Drawing Sheets

BIPOLAR ELECTROCHEMICAL CHARGE STORAGE DEVICES AND A METHOD OF FABRICATING THE SAME

TECHNICAL FIELD

This invention relates in general to electrochemical cells, and more particularly to bipolar electrochemical capacitors having a solid electrolyte disposed between and acting as the substrate for the electrode active materials.

BACKGROUND OF THE INVENTION

Energy generation and storage has long been a subject of study and development. Of special importance is the storage of electrical energy in a compact form that can be readily charged and discharged such as rechargeable electrochemical batteries and/or electrochemical capacitors. High power, high current pulse rechargeable electrochemical charge storage devices are also becoming increasingly important in applications in which electrical pulses are demanded of the cells. Examples of such devices include digital communication devices, power tools, and portable computers to name but a few. In each of these devices, high electrochemical kinetic rate, long cycle life of the electrode material and good ionic conductivity of the electrolyte are all extremely important considerations.

One type of device, the capacitor, and in particular, the bipolar capacitor, has offered a solution to the problems posed by the need for high power consumption devices. Bipolar devices can have higher energy and power density than that of monopolar devices because they generally have more uniform distribution of current density and no voltage loss occurring in the monopolar bus bars. However, bipolar devices need solid bipolar plates between each discrete, stacked capacitor device in order to isolate the ion conductivity of the electrolyte between each device. Disposing a bipolar plate between each discrete device has the effect of increasing the size, weight, and cost of the device.

A prior art bipolar device is illustrated in FIG. 1, in which the bipolar device 10 comprises a series of seven (7) stacked discrete capacitor devices 12, 14, 16, 18, 20, 22, 24, and having end plates 26 and 28 disposed adjacent discrete capacitor devices 12 and 24 respectively. While device 10 includes seven stacked capacitor devices or capacitor subassemblies, it is to be understood that any number of discrete capacitor devices may be arranged in a stacked configuration in order to achieve the performance characteristics required by a particular application.

As each of the discrete devices are essentially identical, only a single discrete device 12 will be described. At the center of discrete device 12 is a bipolar metal substrate 30 fabricated of a material selected from the group of titanium, chromium, nickel, aluminum, gold, silver, copper, indium, tin, brass, stainless steel, alloys thereof, and combinations thereof. Disposed on first and second major surfaces of substrate 30 are first and second electrodes 32 and 34 fabricated of electrode active materials. Examples of electrode active materials include, but are not limited to, ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, and combinations thereof. Alternatively, said electrodes may be fabricated of conducting polymers. The electrodes may either be fabricated from the same or different materials. In the instance in which the electrodes are fabricated of the same material, they are referred to as "symmetric electrodes". Conversely, if they are made from different materials, they are referred to as "asymmetric electrodes".

Disposed on one of the electrodes, for example electrode 34, is a layer of a solid electrolyte material (36). Solid electrolyte materials may be fabricated of polymeric materials acting as a matrix into which is dispersed an ion conducting electrolyte active species. Examples of electrolyte polymer materials include, but are not limited to poly (benzimidazole) (PBI), poly(ethyleneoxide) (PEO), poly (acrylamide) (PAAM), poly(vinylpyrrolidone) (PVP), poly (vinylpyridine) ($P_2VP$), poly(ethyleneimine) (PEI), poly (acrylic acid) (PAA), poly(aminosilicates) (PAS) and combinations thereof. Such materials are taught in commonly assigned, co-pending patent application Ser. Nos. 08/547,821 now U.S. Pat. No. 5,587,872 in the names of Lian, et al and 08/629,174 now U.S. Pat. No. 5,688,613, in the name of Li, et al, the disclosures of which are incorporated herein by reference. The ion conducting electrolyte active species may be solids or liquids, acidic, basic, or salts, and the selection of which is well known in the art.

End plate 26 disposed adjacent discrete capacitor device 12 is fabricated of a bipolar substrate 38 made of a substrate material as described above, and has a layer of electrode active material 40 disposed on one surface thereof and is positioned so that the layer of electrode active material 40 is adjacent electrolyte layer 36 of device 12. End plate 28 similarly comprises a substrate 42, and has disposed thereon a layer of electrode active material 44 and electrolyte material 46 such that layer 46 is adjacent discrete device 24. It may thus be appreciated that for device 10, nine (9) bipolar plates fabricated of, for example titanium, are required. This has a huge impact on the size, weight, and cost of the device.

Accordingly, there exists a need to provide novel electrochemical capacitor device structures which reduce the size and weight of stacked bipolar devices. Moreover, fabrication of such a device should be simple, inexpensive and readily repeatable.

DETAILED DESCRIPTION OF THE PREFERRED EMBODIMENT

Figure 1:
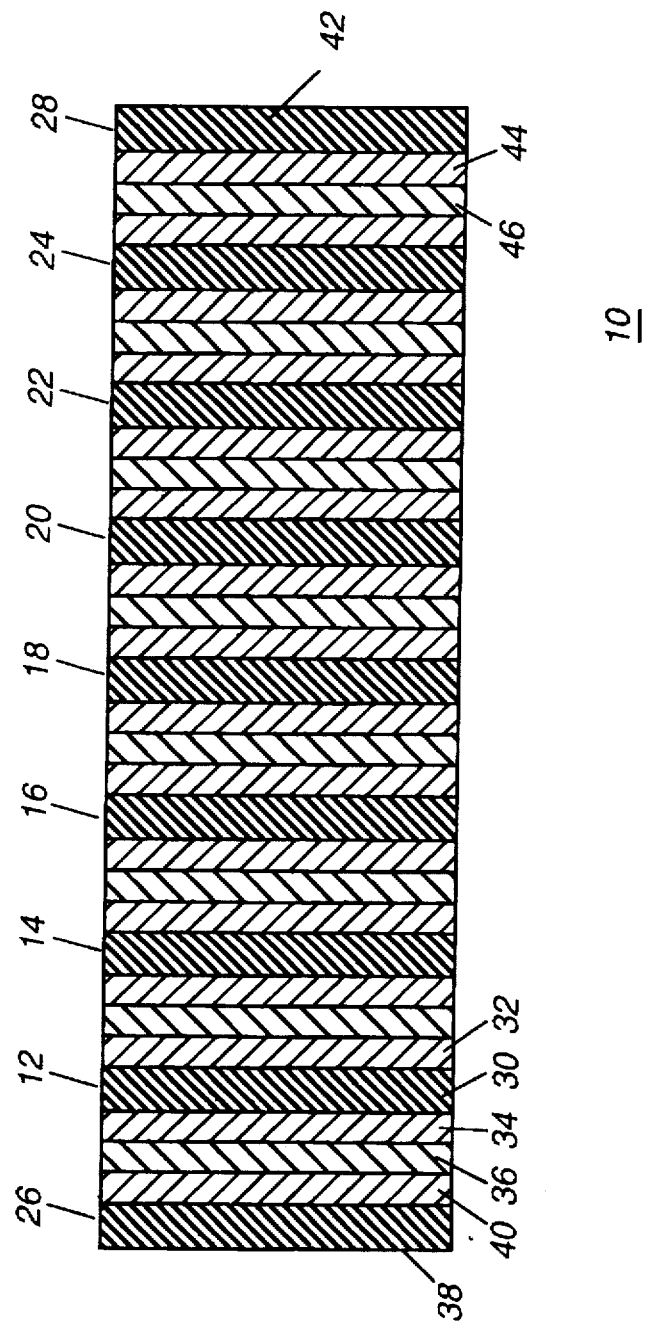
FIG. 1 a schematic representation of a prior art bipolar electrochemical charge storage device.

While the specification concludes with claims defining the features of the invention that are regarded as novel, it is believed that the invention will be better understood from a consideration of the following description in conjunction with the drawing figures, in which like reference numerals are carried forward.

Figure 2:
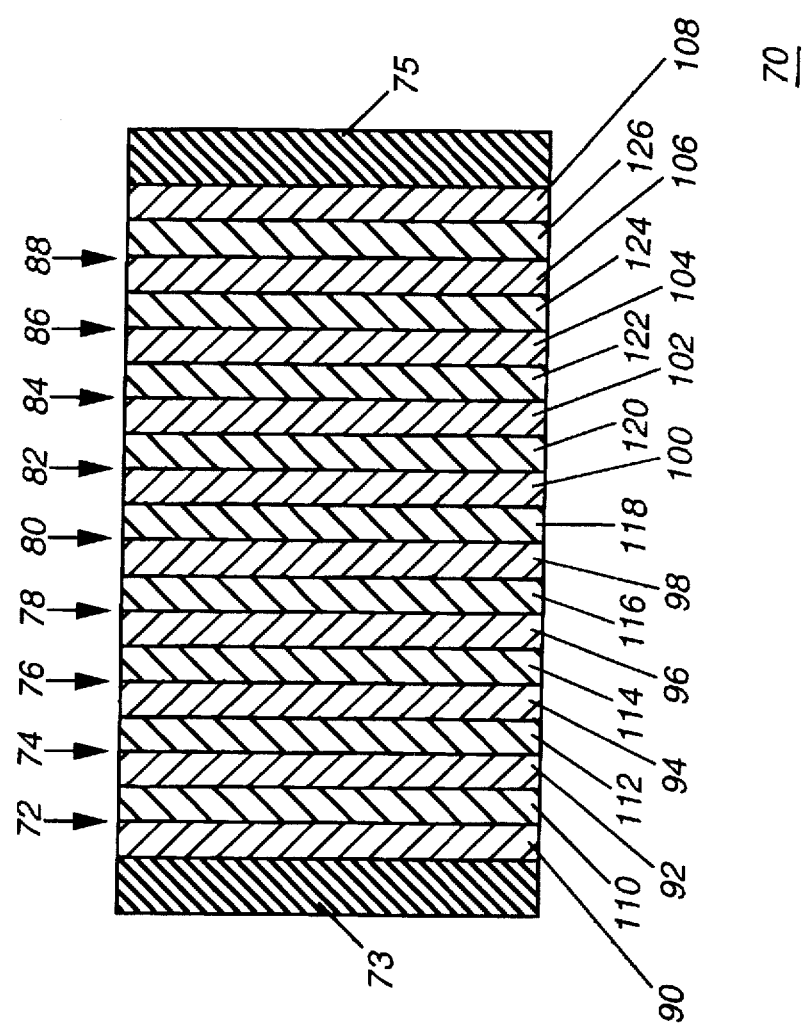
FIG. 2 His a schematic representation of a bipolar electrochemical charge storage device in accordance with the instant invention.

Referring now to FIG. 2, there is illustrated therein a schematic representation of a bipolar electrochemical charge storage device 70, such as an electrochemical capacitor, in accordance with the instant invention. The operative distinction between the device of the instant invention, and the prior art is the absence of a bipolar plate between each discrete bipolar cell in the bipolar electrochemical charge storage device. As many prior art devices employ titanium bipolar plates, this represents a substantial savings since titanium may comprise up to 40% of the cost of the device. Moreover, savings in size and weight result in improved power and energy density.

The device 70 illustrated in FIG. 2, comprises nine (9) discrete bipolar devices 72, 74, 76, 78, 80, 82, 84, 86, 88 arranged in stacked configuration. Disposed adjacent discrete bipolar device 72 is a first current collecting electrode 73, while a second current collecting electrode, 75, is disposed adjacent discrete device 88. Described another way, device 70 comprises ten (10) layers of electrode active material 90, 92, 94, 96, 98, 100, 102, 104, 106 and 108, separated by nine (9) layers of solid electrolyte material 110, 112, 114, 116, 118, 120, 122, 124, and 126. It is to be noted that while the device illustrated in FIG. 2 has nine discrete bipolar devices, the invention is not so limited. Any number of discrete bipolar devices may be employed in order to achieve performance as required for a particular application.

The layers of electrode materials may be fabricated of materials such as those described in the prior art, preferred examples of which include ruthenium and ruthenium oxide. The solid electrolyte materials, however, must be sufficiently solid to assure that the electrolyte active species is immobile, and that adjacent layers of solid electrolyte do not contact one another. In this regard, the solid electrolyte material is characterized by a 1000 hour creep modulus value, at 23° C. of between 0.7 and 2.8 megaPascals (mPa), inclusive, and preferably between 1.0 and 2.0 mPa. The solid electrolyte material preferably consists of a polymeric support structure having an electrolyte active species dispersed therein. Accordingly, the polymeric support structure is selected from the group of polybenzimidazoles, nafion, cross-linked poly (vinyl alcohol), poly(ethylene glycol), acrylated epoxy, acrylated urethane, poly(ethyleneimine) (PEI), polyethylene oxide (PEO), poly(acrylamide) -acrylic acid (PAAM-PAA), poly(2-hydroxyethyl methacrylate), poly(vinyl pyridine) (P2VP), poly(vinyl pyrrolidone) (PVP), poly(vinyl fluoride) (PVF), polyacrylic acid, polyacrylamide (PAAM), polyacrylic acid, poly(vinyl methylethyl ether), phenol formaldehyde, and combinations thereof. In one preferred embodiment, the polymeric support structure is poly{2,2'-m-(phenylene)-5,5'-bibenzimidazole}. Alternatively, other, non-polymeric solid electrolytes may be used in connection with this invention, examples of which include $ZrO_2$, $RbAg_4I_5$, LiF, and combinations thereof.

The electrolyte active species may be solid or liquid, acidic, alkaline or a salt. When acidic, it is typically a proton conducting electrolyte species selected from the group of $H_2SO_4$, $H_3PO_4$, HCl, $HNO_3$, and combinations thereof. Conversely, when alkaline, it is typically a metal hydroxide selected from the group of KOH, NaOH, LiOH, CeOH, and combinations thereof. Exemplary salts include LiCl, $LiAgF_4$, and $AlCl_3$.

Figure 3:
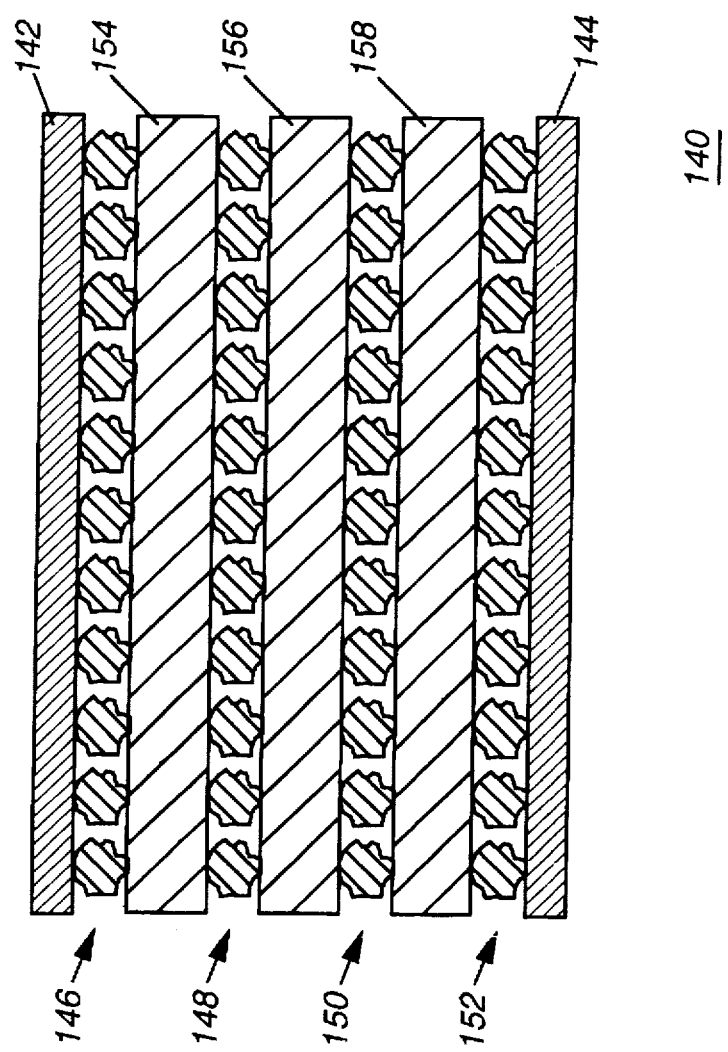
FIG. 3 is a stylized, cross-sectional view of a bipolar electrochemical charge storage device in accordance with the instant invention.

Referring now to FIG. 3, there is illustrated therein a stylized cross-sectional view of a bipolar electrochemical charge storage device in accordance with the instant invention. The device 140 comprises first and second metallic foil current collectors 142, 144, fabricated of materials such as that described hereinabove with respect to the bipolar plates.

The current collectors 142, 144 serve the same purpose as the end plates above, namely to collect current generated by the bipolar device and serve as an electrical contact between the bipolar device and a device to be powered. Disposed between the foil current collecting electrodes are a plurality of layers of electrode active material, in powdered form, as is illustrated by layers 146, 148, 150, and 152. As layers 146-152 are fabricated of powdered materials, it may be appreciated that the layers may not be continuous, but that there are gaps between powder particles in the deposited layer. The active material layers 146-152 are fabricated of electrode active material such as those described hereinabove.

Interposed between the layer of powdered electrode active material are layers of a solid electrolyte material such as those described hereinabove. In this case, electrolyte layers are identified as 154, 156, and 158. Once again, the electrolyte layers are fabricated of solid material such as those described hereinabove, the operative characteristics of such materials being substantially solid and having little or no flow rate, as well as electrical insulation and ionic conductivity between the intervening layers of electrode active material. It may also be appreciated that when the layers of electrode active material are formed of powders, the solid electrolyte layers may actually serve as the substrate into which the powders are deposited.

EXAMPLES

Figure 4:
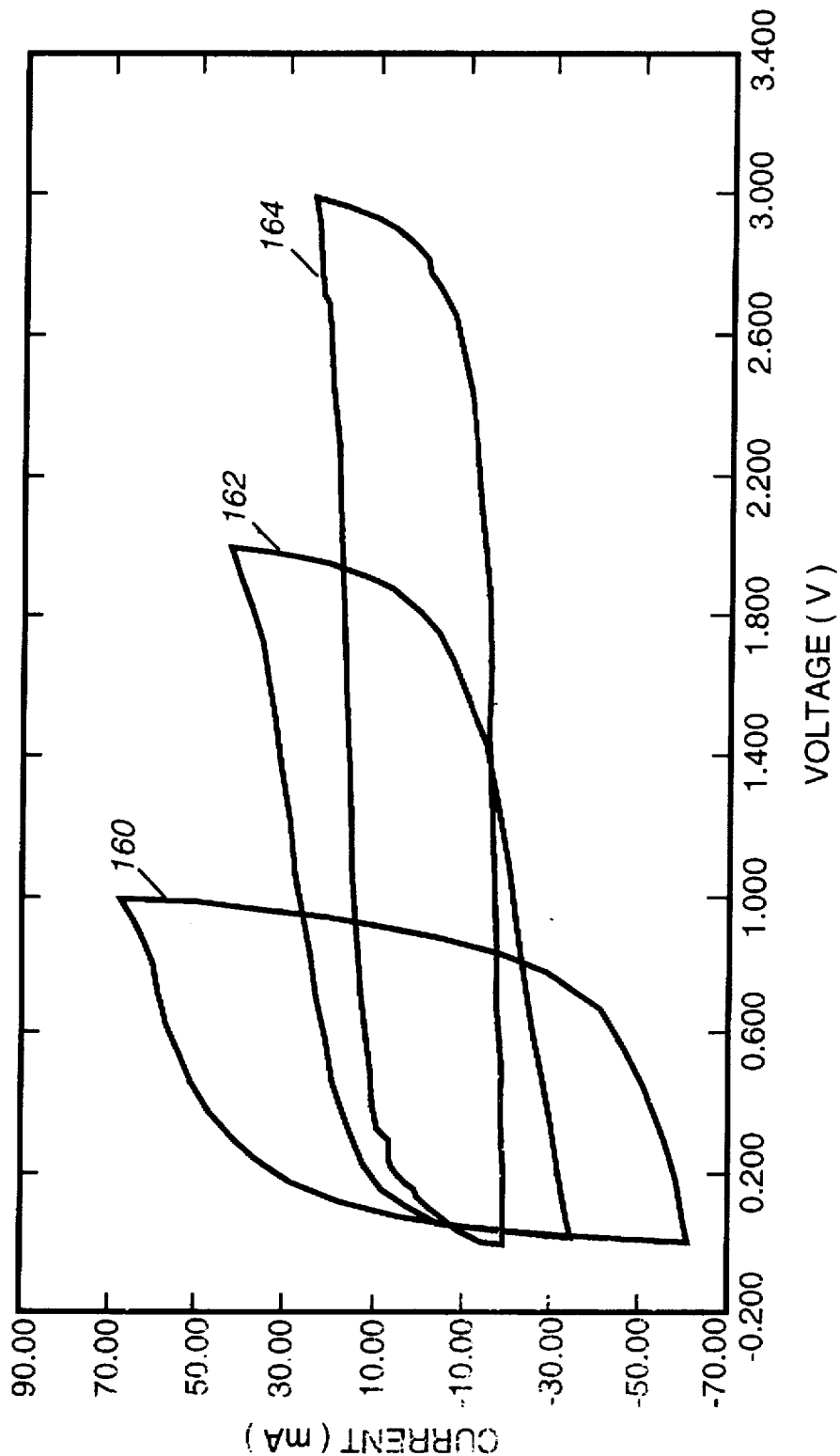
FIG. 4 is a series of cyclic voltammogram curves for 1, 2, and 3 cell bipolar electrochemical capacitor devices, in accordance with the instant invention.

One, two, and three discrete device electrochemical capacitor devices were formed by laminating $RuO_2$ powder imbedded into $PBI/H_3PO_4$ electrolyte films and pressing them under approximately 1000 pounds per square inch ($lbs/in^2$) at room temperature. Titanium foils were used as the current collectors on either end of the devices. Electrochemical performance of these devices were measured using a potentiostat to characterize the devices and conduct cyclic voltammogram analysis. The results are illustrated in FIG. 4. Specifically, FIG. 4 illustrates cyclic voltammograms for one, two, and three-cell bipolar devices without solid metal bipolar plates, as described hereinabove, at lines 160, 162, and 164, respectively. The three-cell device illustrated by line 164 possesses a cell voltage of approximately 3 volts. The device Equivalent Series Resistance (ESR) obtained from the three-cell device was equivalent to 162 milliohms per $cm^2$. This is a lower equivalent series resistance than that of the one and two-cell devices. This may be due to the additional pressing steps which further reduce the interfacial effects between the electrolyte and the electrode active materials. The electrode surface for each of these devices was approximately 5 centimeters square and the scan rate for the cyclic voltammogram was approximately 100 millivolts per second (mV/sec). The capacitances for the one, two and three-cell devices, calculated from FIG. 4, were 450, 300, and 150 millifared (mFa) respectively. This is in conformity with theoretical prediction. The capacitance was equivalent to approximately 100 $mFa/cm^2$ for the single embedded $RuO^2$ electrode, indicating that the embedded $RuO^2$ material can generate greater specific capacitance. Furthermore, the results illustrated in FIG. 4 show that the one, two, and three-cell devices can have a working voltage window of one, two, and three volts respectively, demonstrating that there is no ion shorting between any two cells.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A bipolar electrochemical charge storage device comprising bipolar subassemblies positioned together without any current collectors disposed therebetween, each bipolar subassembly comprising first and second electrode layers disposed on opposite sides of a layer of solid electrolyte material, wherein the bipolar electrochemical charge storage device includes a pair of current collectors between which the bipolar subassemblies are disposed.

2. The bipolar electrochemical charge storage device as in claim 1, wherein, when said bipolar electrochemical charge storage device is assembled, said second electrode layer of a first one of said bipolar subassemblies directly contacts said first electrode layer of a second one of said bipolar subassemblies without a current collector disposed therebetween.

3. The bipolar electrochemical charge storage device as in claim 1, wherein the layer of solid electrolyte material consists of a polymeric support structure having an ion conducting electrolyte active species dispersed therein.

4. The bipolar electrochemical charge storage device as in claim 3, wherein said polymeric support structure is selected from the group consisting of polybenzimidazoles, nafion, cross-linked poly vinyl alcohol, polyethylene glycol, acrylated epoxy, acrylated urethane, poly(thyleneimine) (PEI), polyethylene oxide (PEO), poly(acrylamide)-acrylic acid (PAAM-PAA), poly(2-hydroxyethyl methacrylate), poly (vinyl pyridine) (P2VP), poly(vinyl pyrrolidone) (PVP), poly(vinyl fluoride) (PVF), polyacrylic acid, polyacrylamide (PAAM), poly(vinyl pyridine) (P2VP), poly(vinyl methylethyl ether), phenol formaldehyde, and combinations thereof.

5. The bipolar electrochemical charge storage device as in claim 3, wherein said polymeric support structure is poly{2,2'-m(phenylene)-5,5'-bibenzimidazole}.

6. The bipolar electrochemical charge storage device as in claim 3, wherein said electrolyte active species is a proton conducting electrolyte species.

7. The bipolar electrochemical charge storage device as in claim 6, wherein said proton conducting electrolyte species is selected from the group of $H_2SO_4$, $H_3PO_4$, HCl, $HNO_3$, and combinations thereof.

8. The bipolar electrochemical charge storage device as in claim 3, wherein said electrolyte active species is a metal hydroxide.

9. The bipolar electrochemical charge storage device as in claim 8, wherein said metal hydroxide electrolyte active species is selected from the group of KOH, NaOH, LiOH, CeOH, and combinations thereof.

10. A bipolar electrochemical capacitor device comprising at least one bipolar capacitor subassembly, each bipolar capacitor subassembly comprising first and second electrode layers disposed on opposite sides of a layer of solid electrolyte material, and said at least one bipolar capacitor subassembly being disposed between a pair of current collecting electrodes, wherein said solid electrolyte material is characterized by a 1000 hour creep modulus at 23° C. of between 0.7 and 2.8 mega Pascals (mPa).

11. A bipolar electrochemical capacitor device comprising at least one bipolar capacitor subassembly, each bipolar capacitor subassembly comprising first and second electrode layers disposed on opposite sides of a layer of solid electrolyte material, and said at least one bipolar capacitor subassembly being disposed between a pair of current collecting electrodes, wherein said solid electrolyte material is characterized by a 1000 hour creep modulus at 23° C. of between 1.0 and 2.0 mega Pascals (mPa).

12. A method of fabricating a bipolar electrochemical charge storage device, said method comprising the steps of:
fabricating a first bipolar subassembly by:
providing a first layer of a solid polymeric electrolyte material, said first layer having first and second major surfaces; and
disposing first and second layers of electrode active material on said first and second major surfaces, respectively;
fabricating a second bipolar subassembly by:
providing a second layer of a solid polymeric electrolyte material, said second layer having first and second major surfaces; and
disposing first and second layers of electrode active material on said first and second major surfaces, respectively; and
assembling at least said first and second bipolar subassemblies together with the second layer of electrode active material for the first bipolar subassembly in direct contact with the first layer of electrode active material for the second bipolar subassembly without a current collector disposed therebetween.

13. The method as in claim 12, wherein the layer of solid electrolyte material consists of a polymeric support structure having an electrolyte active species dispersed therein.

14. The method as in claim 13, wherein said polymeric support structure is selected from the group of polybenzimidazoles, nafion, cross-linked poly vinyl alcohol, polyethylene glycol, acrylated epoxy, acrylated urethane, poly(thyleneimine) (PEI), polyethylene oxide (PEO), poly (acrylamide)-acrylic acid (PAAM-PAA), poly(2-hydroxyethyl methacrylate), poly(vinyl pyridine) (P2VP), poly(vinyl pyrrolidone) (PVP), poly(vinyl fluoride) (PVF), polyacrylic acid, polyacrylamide (PAAM), poly(vinyl pyridine) (P2VP), poly(vinyl methylethyl ether), phenol formaldehyde, and combinations thereof.

15. The method as in claim 13, wherein said polymeric support structure is poly{2,2'-m-(phenylene)-5,5'-bibenzimidazole}.

16. The method as in claim 13, wherein said electrolyte active species is a proton conducting electrolyte species.

17. The method as in claim 16, wherein said proton conducting electrolyte species is selected from the group of $H_2SO_4$, $H_3PO_4$, HCl, $HNO_3$, and combinations thereof.

18. The method as in claim 13, wherein said electrolyte active species is a metal hydroxide.

19. The method as in claim 18, wherein said metal hydroxide electrolyte active species is selected from the group of KOH, NaOH, LiOH, CeOH, and combinations thereof.

20. The method of claim 12, further comprising the steps of:
positioning a first current collector in contact with the first layer of electrode active material for the first bipolar subassembly; and positioning a second current collector in contact with the second layer of electrode active material for the second bipolar subassembly.

21. A method of fabricating a bipolar electrochemical capacitor subassembly, said method comprising the steps of:

providing a first layer of a solid polymeric electrolyte material, said first layer having first and second major surfaces, wherein said solid polymeric electrolyte material is characterized by a 1000 hour creep modulus at 23° C. of between 0.7 and 2.8 megaPascals (mPa); and disposing first and second layers of electrode active material on said first and second major surfaces, respectively.

22. A method of fabricating a bipolar electrochemical capacitor subassembly, said method comprising the steps of:

providing a first layer of a solid polymeric electrolyte material, said first layer having first and second major surfaces, wherein said solid polymeric electrolyte material is characterized by a 1000 hour creep modulus at 23° C. between 1.0 and 2.0 mega Pascals (mPa); and disposing first and second layers of electrode active material on said first and second major surfaces, respectively.

* * * * *